(12) United States Patent
Moncelle et al.

(10) Patent No.: US 9,513,997 B2
(45) Date of Patent: Dec. 6, 2016

(54) TEST DATA MANAGEMENT

(71) Applicant: STATE FARM MUTUAL AUTOMOBILE INSURANCE COMPANY, Bloomington, IL (US)

(72) Inventors: Mark Moncelle, Lexington, IL (US); Steven Beatty, Saybrook, IL (US); Walter Krafft, Peoria, IL (US); John Horrocks, Southlake, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/316,115

(22) Filed: Jun. 26, 2014

(65) Prior Publication Data

US 2015/0378828 A1 Dec. 31, 2015

(51) Int. Cl.
*G06F 17/30* (2006.01)
*G06F 11/14* (2006.01)

(52) U.S. Cl.
CPC ..... *G06F 11/1402* (2013.01); *G06F 17/30289* (2013.01); *G06F 17/30424* (2013.01)

(58) Field of Classification Search
CPC .............. G06F 17/30595; G06F 17/30424; G06F 17/30289; G06F 11/1402; G06Q 10/067
See application file for complete search history.

(56) References Cited

U.S. PATENT DOCUMENTS

| | | | |
|---|---|---|---|
| 7,702,613 B1* | 4/2010 | Dankenbring et al. | 707/687 |
| 2002/0069077 A1* | 6/2002 | Brophy | G06Q 10/067 705/322 |
| 2003/0187768 A1* | 10/2003 | Ryan et al. | 705/35 |
| 2008/0235041 A1* | 9/2008 | Cashdollar | G06Q 10/10 705/1.1 |
| 2009/0282273 A1* | 11/2009 | Hamilton, II | G06F 1/3203 713/320 |
| 2012/0046975 A1* | 2/2012 | Stolze | G06Q 40/08 705/4 |
| 2012/0166387 A1* | 6/2012 | Nakamura | 707/609 |
| 2013/0055042 A1* | 2/2013 | Al Za'noun | G06Q 10/06395 714/746 |
| 2014/0282848 A1* | 9/2014 | Patwardhan et al. | 726/1 |

* cited by examiner

*Primary Examiner* — Tarek Chbouki
(74) *Attorney, Agent, or Firm* — Marshall, Gerstein & Borun LLP; Randall G. Rueth

(57) ABSTRACT

A method for managing test data includes receiving a request indicative of a testing application from a requesting user and identifying a plurality of test data in a source database matching the request. Further, the method includes determining a reserved status of the plurality of test data, and, when the reserved status indicates that the plurality of test data is not reserved by the user other than the requesting user, reserving the plurality of test data for the requesting user. Still further, the method includes transferring a copy of the plurality of test data to a test database, wherein a testing application executes based on the copy of the plurality of test data stored in the test database.

10 Claims, 3 Drawing Sheets

TEST DATA MANAGEMENT

TECHNICAL FIELD

The present disclosure generally relates to shared databases and, more particularly, to a method for reserving and managing test data.

BACKGROUND

A user accessing a shared database, such as a database used for testing website applications or customer management systems, may interfere with other users of the shared database by updating records currently being accessed by the other users. Some testing applications assume that that "Collisions" between users of a large database are rare based on the sheer number of records in the database as compared with the number of user. However, in cases when collisions occur, users are forced to manually coordinate data usage such that random selections of data do not negatively impact each of the users. This situation often results in over-provisioning of data in test systems, and lost productivity when collisions occur.

Other data managements systems segment test data into separate isolated databases for each user or group of users accessing the test data. However, such isolated systems are complicated to setup and maintain and may require expensive infrastructure. Moreover, new databases must be frequently created or modified for new users or current users with new testing applications, thus, such an isolated database management system does not provide a flexible testing environment.

SUMMARY

In one embodiment, a computer-implemented method for managing test data comprises receiving, via a network interface, a request indicative of a testing application from a requesting user, identifying, with one or more processors, a plurality of test data in a source database matching the request, and determining, via the one or more processors, a reserved status of the plurality of test data, wherein the reserved status is indicative of a current utilization of at least some of the plurality of test data by a user other than the requesting user. Further the method includes, when the reserved status indicates that the plurality of test data is not reserved by the user other than the requesting user, reserving, with the one or more processors, the plurality of test data for the requesting user, wherein reserving the plurality of test data includes updating a record in a reservation database corresponding to the plurality of test data, and transferring, with the one or more processors, a copy of the plurality of test data to a test database, wherein a testing application executes based on the copy of the plurality of test data stored in the test database.

In another embodiment, a computer device for managing test data comprises one or more processors and one or more memories coupled to the one or more processors, wherein the one or more memories include computer executable instructions stored therein that, when executed by the one or more processors, cause the one or more processors to: receive, via a network interface, a request indicative of a testing application from a requesting user; identify a plurality of test data in a source database matching the request; and determine a reserved status of the plurality of test data, wherein the reserved status is indicative of a current utilization of at least some of the plurality of test data by a user other than the requesting user. Further the computer executable instructions cause the one or more processors to: when the reserved status indicates that the plurality of test data is not reserved by the user other than the requesting user, reserve the plurality of test data for the requesting user, wherein reserving the plurality of test data includes updating a record in a reservation database corresponding to the plurality of test data; and transfer a copy of the plurality of test data to a test database, wherein a testing application executes based on the copy of the plurality of test data stored in the test database.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

System Overview

Figure 1:
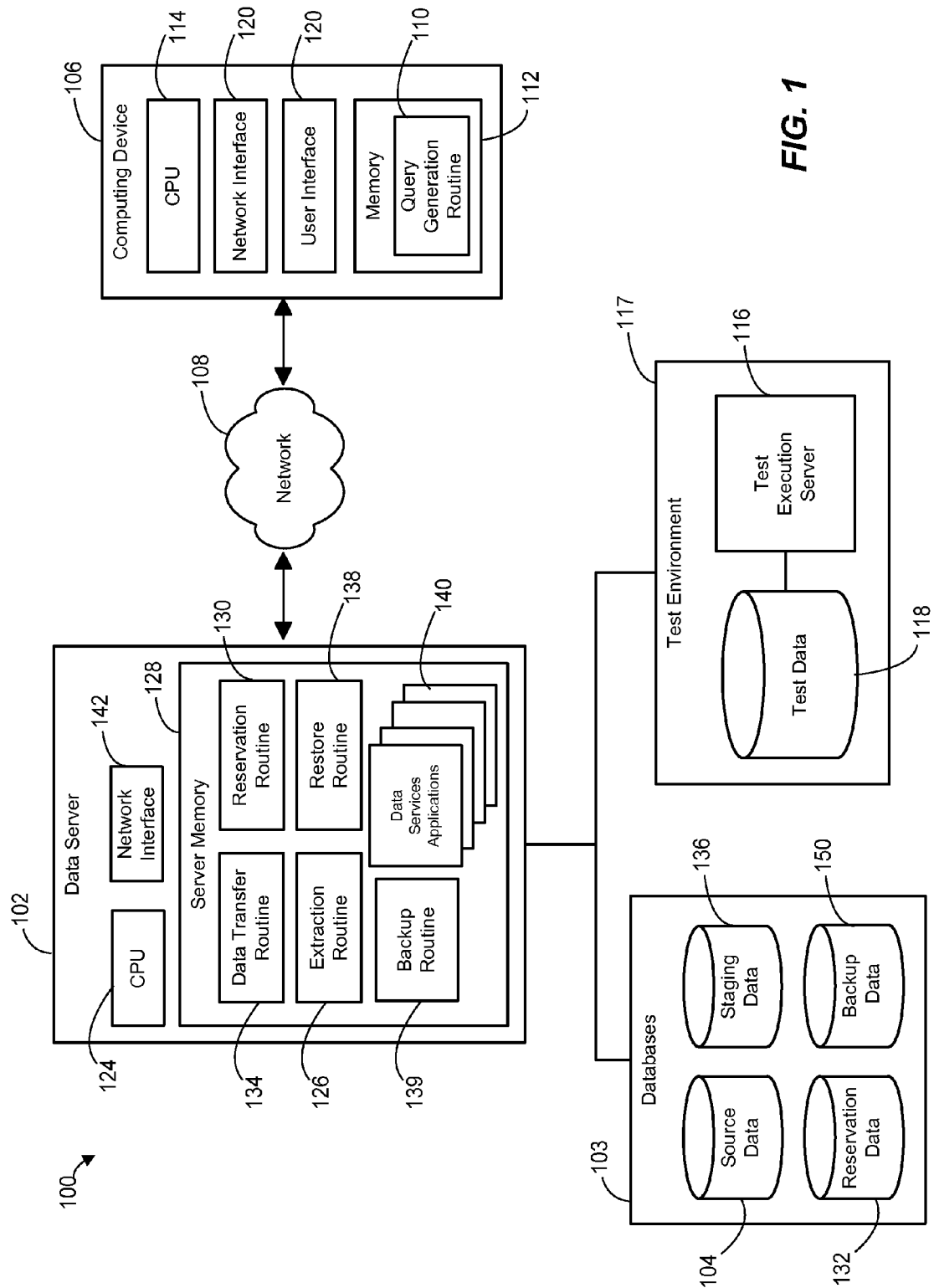
FIG. 1 illustrates an example computing environment for test data management.

FIG. 1 illustrates an example computing environment 100 in which a data server 102 may reserve test data for a specific user, group of users, or testing application and manage all such reservations. One or more databases 103 may include a source database 104 storing data for any suitable type of testing, such as testing of website applications, customer management systems, proprietary management systems for certain products or services (e.g., insurance, banking, etc.), mobile applications, etc., for example.

A user may reserve data for a testing application, by sending a request from a computing device 106 to the data server 102 over a network 108. The network may be any suitable mobile or wide-area network, such as the Internet, for example. In some implementations, a request generation routine 110, stored in a memory 112 (e.g., which may include both volatile and nonvolatile media, removable and non-removable media) and executed by a CPU 114, may generate a request, and the computing device 106 may send the request to the data server 102 to reserve test data. The request may include, by way of example, information identifying one or more types of data needed for the testing application (e.g., line of business, accounts, etc.), one or more test cases needed for the testing application (e.g., certain customer, product, or transaction types), amounts or data needed for the testing application (ten thousand data points, one terabyte, etc.), and a reference to a script or code defining a testing sequence or testing application to be run by a test execution server 116.

The test execution server 116 is part of a testing environment 117 that may, in some implementations, be dedicated to a certain testing application. The testing environment may include one or more databases, such as a test database 118, storing data for use by the dedicated testing application. Although illustrated as including one test execution server 116 and one test database 118, it is understood the a testing application may be executed by any number of suitable servers on any number of processors.

Further, although a user may initiate a testing application (e.g., executed by the test execution server 116) from the computing device 106 at any time, it is understood that a testing application may be an automated, or batch, testing application that is executed without user interaction. For example, certain test data management functions, such as back up or restore, may be automatically executed on the test data on each day, every week or after certain triggering events.

In response to a request for reserved data, the data server 102 may execute (e.g., via a CPU 124) an extraction routine 126 stored in a server memory 128 to identify data within the source database 104 that matches the request. In general, data in the source database 104 may match the request according to any or all of the information included within the request. In one scenario, a request for an insurance testing application may identify a particular type of insurance policy (e.g., policy for a non-smoker under the age of thirty) for which test data (e.g., claims, policy changes, etc.) is required, and the extraction routine 126 may identify data within the source database 104 corresponding to this particular type of insurance policy.

The server may then execute a reservation routine 130 to determine if the test data identified by the extraction routine 126 is currently reserved for another user or testing application. For example, the reservation routine 130 may query a reservation database 132, where the reservation database 132 stores the current reservation status of portions of test data in the source database 104. In one implementation, the reservation database 132 may assign a reserved or available status to each key value (e.g., row, column, tree structure, etc.) used to identify portions of data in the source database 104. In addition, the reservation database 132 may include records indicated to whom (e.g., to which user, group, etc.) portions of the test data are reserved.

In one example scenario, the source database 104 may include data related to insurance policies, where the data is organized by key values corresponding to a household identification, customer identification, and/or policy identification (e.g., such as an identification number or code). In such a case, the reservation database 132 may store a record for each of the key values indicating whether data corresponding to the respective household, customer, or policy is available for testing, currently being used in another testing application, or reserved for another testing application. In some cases, test data may be organized in a tree structure (e.g., household corresponds to multiple client and clients correspond to multiple policies), and the reservation routine 130 may search a one or more trees to determine if all nodes (e.g., clients and policies) in a respective tree are available for reservation. Further details of such tree structure and reservation methods are discussed with reference to FIG. 3.

Further, the reservation routine 130 may update the reservation database 132 to indicate newly reserved test data for a testing application identified in a request, in an implementation. For example, the reservation routine 130 may update particular records in the reservation database 132 corresponding to identified data (e.g., identified by the extraction routine 126) when the identified data is not reserved or associated with another user, group, or testing application. The newly updated records may indicate that the identified data is reserved for a testing application indicated in the request.

In some implementations, the server may execute a data transfer routine 134 to transfer data from the source database 104 to a staging database 136. For example, the data transfer routine 134 may receive a reservation confirmation or indication generated by the reservation routine 130, where the confirmation indicated that portions of test data have been newly reserved for a testing application. Subsequently, the data transfer routine 134 may retrieve the corresponding portions of test data from the source database 104 and transfer the portions of test data to the staging database 136.

In some cases, the data server 102 may send a reservation and data transfer confirmation to the computing device 106 to confirm that data associated with a request is available and transferred to the staging database 136. The data server 102, the computing device 106, or another suitable server may verify or modify portions of test data transferred to the staging database 136 to meet specific requirements of a particular test case, in some implementations. For example, a user may review portions of the transferred data via the user interface 120, or a server may execute a script to transform the transferred data into a convenient format for a testing application. In some cases, such modification of data in the staging database 136 is automated via a test data modification server (not shown).

Once reserved test data in the staging database 136 is reviewed and/or modified, the data server 102 may further execute the data transfer routine 134 to transfer the reviewed and/or modified data to the test database 118, in an implementation. The data server 102 may send a confirmation of such a transfer to the test execution server 116, and the test execution server 116 may execute a testing application based on the data transferred to the test database 118, for example.

Although FIG. 1 illustrates one computing device, the techniques of the present disclosure may be utilized such that multiple users may execute testing applications with a user experience similar to that of executing testing applications on multiple isolated databases. Thus, the techniques of the present disclosure may allow shared test data (e.g., in the source database 104) to be managed in a manner that avoids user "collisions" (e.g., via reserving portions of data in the source database 104 and transferring the portions of data to the testing environment 118) while maintaining a flexible, shared repository of test data.

In some cases, the data server 102 may create a backup copy of the reserved data. For example, the data server 102 may execute a backup routine 139 to extract a copy of the reserved data from source database 104 and transfer the extracted copy to a backup database 150. When a particular testing application requires multiple steps, for example, the user may request that a backup copy of the reserved data be generated after each step. The user may further request that one of the backup copies (e.g., transferred after each step of the testing application) stored in backup database 150 be transferred to the test database 104, in an implementation. Such a copy may allow a testing application to repeat one or more steps of a test without repeating the test in its entirety, for example.

In some scenarios, a user may wish to run a testing application on data in the test database 104 multiple times or with multiple configurations. As such, the data server 102 may execute a restore routine 138 to move a copy of test data stored in the backup database 150 to the test database 104 (e.g., a copy representing a previous state of the test data before a most recent test). For example, a certain testing application, executed by the test execution server 116, may test a number of customer information updating schemes (e.g., schemes that update addresses, phone numbers, etc.) on a set of customer data in the test database 118. In such a case, the data in the test database 118 is altered by testing one of the customer information updating scheme, but the restore routine 138 may reset the customer data to an unaltered state after each respective test.

Further, the data server 102 may include a plurality of data services applications 140 that, when executed by the CPU 124, perform a variety of administrative functions related to the reservation database 132. For example, the data services applications 140 may track the amount of test data currently reserved for testing, the location (e.g., source database 104, staging database 136, or backup database 150) of test data, the status of current testing applications, etc. In some cases, the data services applications 140 may allow human operators of the computing device 106 or other computing device to manually reserve or make available portions of test data, analyze errors generated by testing data management applications, abort testing data management applications, etc.

Although FIG. 1 illustrates one data server 102, it is understood that any number of servers may execute the routines 126, 130, 134, 138, and 139 and the data services applications 140. Further, a server or multiple servers may be devoted to each of the functions of the routines 126, 130, 134, 138, and 139 and the data services applications 140, and/or the functionality of the routines 126, 130, 134, 138, and 139 and the data services applications 140 may be combined or segmented into any number of routines, software applications, scripts, etc. Still further, although FIG. 1 illustrates one staging database 136, test database 118, source database 104, backup database 150, and test execution server 116, any suitable number of servers and databases may be utilized to execute testing applications and store corresponding test data.

Managing Test Data

Figure 2:
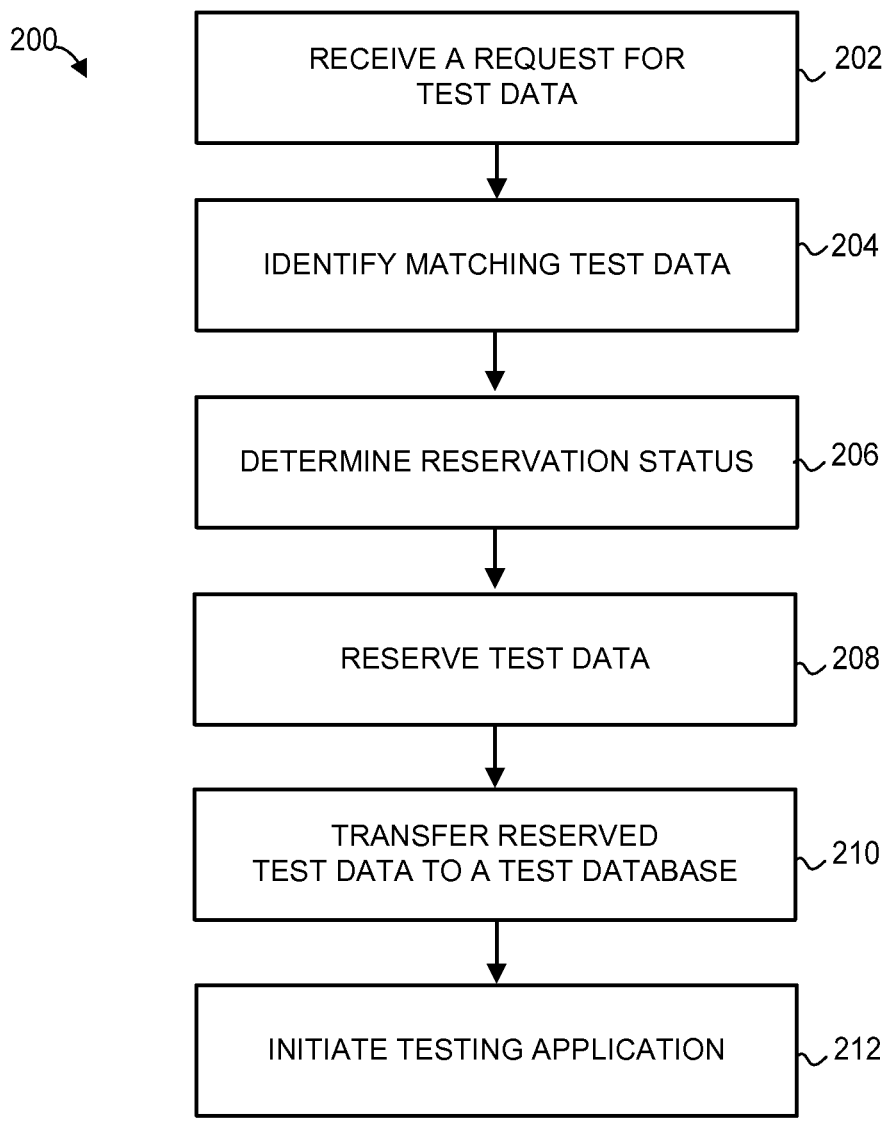
FIG. 2 is a flow diagram of an example method for managing test data which can be implemented in the system illustrated in FIG. 1.

FIG. 2 is a flow diagram of an example method 200 for managing test data in a source database that is shared among multiple users. The method 200 may be implemented by the data server 102, for example.

To begin, a request is received for the reservation and utilization of test data (block 202). In general, a specific user (e.g., developer, quality assurance analyst) or group of users (e.g., website performance test group, application development group, etc.) may request test data for a specific testing application. By way of example and without limitation, testing applications may include website application performance tests (e.g., browser/operating system compatibility, load and stress, virtual user simulation, bottleneck, performance leakage, etc. tests), customer relationship management application tests (e.g., error detection, optimization, functionality, data quality, duplication of data, data sorting, field population, etc. tests), e-commerce application testing (e.g., transaction, shipping, confirmation, etc. tests), and proprietary service or product management application tests (e.g., insurance, banking, infrastructure as a service, etc. application tests).

In some implementations, a request for the reservation and utilization of test data may include information about the source of the request (e.g., user, group, authentication, computer address, etc.), information about the type and amount of data needed for a test, and information identifying a testing environment in which the test application will be executed. In one scenario, the computing device 106 may send a request to data server 102 to reserve a set of test data for a "web servicing team" matching certain requirements. Further, the example request may include information regarding the number of records to be reserved and a testing environment (e.g., including a test database, such as test database 118) where data is to be ultimately transferred.

The response may be communicated to from a computing device, such as a user workstation, to a data server in any appropriate manner. For example, the computing device 106 may send a request, via one or more network interfaces 142, to the data server 102 using a hypertext transfer protocol (HTTP) message or a proprietary database/testing protocol language. In some implementations, a user may access a web interface or portal to submit test data reservation requests. For example, the computing device 106 may execute a web browser application (e.g., Google Chrome™ browser, Apple Safari®, etc.) such that a user may access an online portal. Subsequently, the user may complete forms via a user interface 144 at the computing device 106 to describe a request, and a web server may transfer the completed request to the data server 102.

Next, test data matching the request is identified (block 204). In some implementations, a request may include information identifying the type(s) of test data needing for a testing application, and a routine, such as the extraction routine 126, may search for and identify matching test data in a source database, such as source database 104. In one scenario, a request corresponding to a testing application for an insurance application includes an indication that the type of test data needed for the application corresponds to homeowners insurance policies for brick homes in the Midwestern United States. As such, the extraction routine 126 may query the source database 104 to identify insurance policies matching these criteria.

In some implementations, the request format and the extraction routine 126 may be based at least partially on languages, queries, and/or data mining techniques of software frameworks such as MySQL, Hadoop, NoSQL, etc. However, in general the extraction routine 126 may be based on any suitable data mining or data extraction applications and techniques such as proprietary data mining applications for specific products and/or services (e.g., an application developed specifically for insurance or e-commerce companies).

Upon identifying data matching a request, the reservation status of the identified data is determined (block 206). For example, the reservation routine 130 may query the reservation database 132 to determine the current reservation status of the identified data. Further details of the example reservation database 132 are discussed with reference to FIG. 1.

Figure 3:
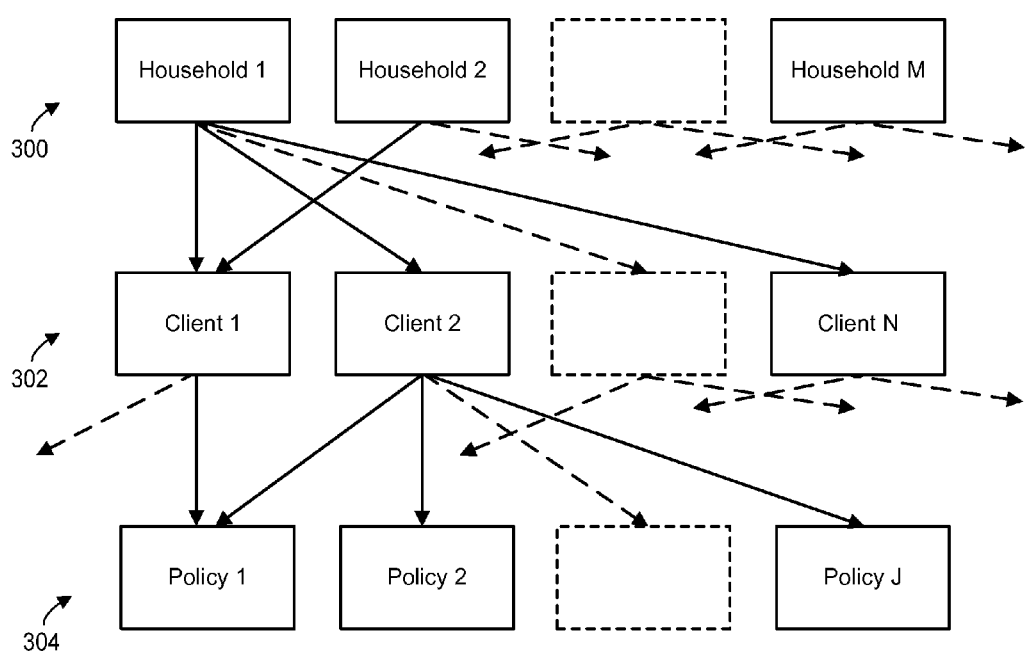
FIG. 3 illustrates an example tree structure of test data which can be implemented in the test database illustrated in FIG. 1.

In some implementations, data in a source database, such as source database 104, may be organized according to a tree structure. As illustrated in FIG. 3, an example case of such a tree structure is a set of insurance policy test data organized according to a household level 300, a client level 302, and a policy level 304. Each household on the household level 300 may include multiple clients on the client level 302, and each client may include multiple insurance policies on the policy level 304. For example, a household may include two persons (i.e., clients) and each client may have an automotive insurance policy, homeowners insurance policy, etc. Due to the nested structure of such data, a reservation routine, such as reservation routine 130, may search a reservation database for reservations of data associated with each level of a tree structure, in an implementation. For example, if the extraction routine 126 identifies test data related to certain insurance policies, the reservation routine 130 may search corresponding households on the household level 300 for test data reservations. Subsequently, the reservation routine 130 may search corresponding clients on the client level 302 and finally the policies on the policy level 304 for test data reservations. In such a manner, a reservation routine may determine if an entire tree structure associated with an identified test data node (e.g., insurance policy) is available for testing.

Returning to FIG. 2, available test data is reserved for the testing application (block 208). For example, once the extraction routine 126 identifies appropriate test data and the reservation routine 130 verifies that the test data is not reserved, the reservation routine 130 may reserve the identified test data for the testing application indicated in the request. In some implementations, the reservation routine 130 may reserve the available test data by updating corresponding records in the reservation database 132. For example, the reservation routine 130 may modify existing "available" indications, corresponding to the identified test data, to indicate a "reserved" status.

In some cases, a request may indicate a need for only a certain amount of test data, and, as such, a reservation routine 130 may only reserve the certain amount of test data. For example, a request may indicate that test data for two hundred insurance policies is needed for a testing application. At the same time, the extraction routine 126 may identify one thousand matching insurance policies. In such an example case, the reservation routine 130 may only reserve two hundred of the one thousand matching insurance policies for the testing application, based on the information included in the request.

After reserving data for a testing application, the reserved data may be transferred to a staging database, such as staging database 136, in some implementations. For example, the reservation routine 130 may generate a new reservation indication, and, upon receiving the new reservation indication, the data transfer routine 134 may transfer (e.g., copy) the newly reserved test data to the staging database 136. In some implementations, users may elect to review or modify the reserved test data in the staging database 136 (e.g., via the user interface 120) such that the reserved test data meets specific requirements of a particular test case. For example, the user may elect to utilize manual or automated techniques to modify to the reserved test data in the staging database 136. Further, a backup copy of the reserved test data may be stored in a backup database, such as the backup database 150, in an implementation.

Next, the reserved test data is transferred to a test database such that a test application can be executed on the reserved test data (block 210). In some scenarios in which a user elects to review or modify test data, the data server 102 may transfer reviewed or modified test data from the staging database 136 to the test database 118. In other scenarios, the data server 102 may directly transfer reserved test data from the source database 104 to the test database 118 for use in a testing application.

In some implementations, users may receive a confirmation or error message related to the reservation of data. For example, if data matching a request is unavailable for testing a user of the computing device 106 may receive an error message (e.g., via a website portal interface, email communication, etc.). Alternatively, if data is successfully reserved, the data server 102 may send a user a confirmation message indicating that data has been reserved and transferred and testing may begin.

Next, an instance of the testing application is executed on a test execution server, such as test execution server 210 (block 212). In some implementations, a testing application is initiated automatically upon reservation and transfer of test data. In other implementations, data may be reserved and transferred, but testing may only begin after user confirmation or interaction. For example, a user may receive a message indicating data transfer via a website portal or email, and the user may select a link in the message to confirm data transfer and initiate testing.

Further, testing applications involve multiple stages of execution and/or multiple executions of a single script, code, or analysis, in an implementation. In such cases, a restore routine, such as the restore routine 138, may move a copy of test data stored in the backup database 150 to the test database 104. In this manner, reserved test data may be restored allowing a testing application to repeat one or more steps of a test without repeating the test in its entirety, for example.

We claim:

1. A computer-implemented method for managing test data, the method comprising:
   receiving, via a network interface, a request indicative of a testing application from a requesting user, wherein the request indicates one or more criteria of insurance policies required for the testing application;
   querying a source database that stores data organized according to a tree structure having at least (i) a household level, (ii) a client level, and (iii) an insurance policy level;
   identifying, in the source database and with one or more processors, a plurality of test data associated with insurance policies matching the one or more criteria;
   determining, via the one or more processors, a reserved status of the plurality of test data, at least in part by (i) determining a first reserved status, at the household level, of data corresponding to the identified plurality of test data, (ii) determining a second reserved status, at the client level, corresponding to the identified plurality of test data, and (iii) determining a third reserved status, at the insurance policy level, corresponding to the identified plurality of test data, wherein the reserved status is indicative of a current utilization of at least some of the plurality of test data by a user other than the requesting user;
   when the reserved status indicates that the plurality of test data is not reserved by the user other than the requesting user, reserving, with the one or more processors, the plurality of test data for the requesting user, wherein reserving the plurality of test data includes updating a record in a reservation database corresponding to the plurality of test data;

transferring, with the one or more processors, a copy of the plurality of test data to a staging database;

modifying the copy of the plurality of test data in the staging database according to one or more user-selected manual or automated techniques; and transferring, with the one or more processors, the modified copy of the plurality of test data from the staging database to a test database, wherein a testing application executes based on the modified copy of the plurality of test data stored in the test database.

2. The computer implemented method of claim 1, wherein the request indicative of a testing application includes an authorization of the requesting user.

3. The computer implemented method of claim 1, further comprising:

transferring, with the one or more processors, the copy of the plurality of test data to a backup database.

4. The computer implemented method of claim 3, further comprising:

restoring, with the one or more processors, the copy of the plurality of test data in the test database to match the copy of the plurality of test data stored in the backup database.

5. The computer implemented method of claim 1, wherein updating the record in the reservation database corresponding to the plurality of test data includes:

identifying a plurality of key values corresponding to the plurality of test data; and revising a record corresponding to each of the plurality of key values from an available status to a reserved status.

6. The computer implemented method of claim 1, wherein executing the testing application is an interactive process completed after transferring the copy of the plurality of test data to the staging database and requiring user interaction.

7. The computer implemented method of claim 1, further comprising:

when the reserved status indicates that the plurality of test data is not reserved by the user other than the requesting user, sending, via the network interface, a confirmation message to the requesting user informing the requesting user that the data reservation succeeded.

8. A computer device for managing test data, the computer device comprising:

one or more processors; and one or more memories coupled to the one or more processors;

wherein the one or more memories include computer executable instructions stored therein that, when executed by the one or more processors, cause the one or more processors to:

receive, via a network interface, a request indicative of a testing application from a requesting user, wherein the request indicates one or more criteria of insurance policies required for the testing application;

query a source database that stores data organized according to a tree structure having at least (i) a household level, (ii) a client level, and (iii) an insurance policy level;

identify, in the source database, a plurality of test data associated with insurance policies matching the one or more criteria;

determine a reserved status of the plurality of test data, at least in part by (i) determining a first reserved status, at the household level, of data corresponding to the identified plurality of test data, (ii) determining a second reserved status, at the client level, corresponding to the identified plurality of test data, and (iii) determining a third reserved status, at the insurance policy level, corresponding to the identified plurality of test data, wherein the reserved status is indicative of a current utilization of at least some of the plurality of test data by a user other than the requesting user;

when the reserved status indicates that the plurality of test data is not reserved by the user other than the requesting user, reserve the plurality of test data for the requesting user, wherein reserving the plurality of test data includes updating a record in a reservation database corresponding to the plurality of test data;

transfer a copy of the plurality of test data to a staging database;

modify the copy of the plurality of test data in the staging database according to one or more user-selected manual or automated techniques; and transfer the modified copy of the plurality of test data from the staging database to a test database, wherein a testing application executes based on the modified copy of the plurality of test data stored in the test database.

9. The computer device of claim 8, wherein the computer executable instructions further cause the one or more processors to:

transfer the copy of the plurality of test data to a backup database.

10. The computer device of claim 9, wherein the computer executable instructions further cause the one or more processors to:

restore the copy of the plurality of test data in the test database to match the plurality of test data in the backup database.

* * * * *